United States Patent
Cook et al.

(10) Patent No.: US 9,199,721 B2
(45) Date of Patent: Dec. 1, 2015

(54) WING FLAPS FOR AIRCRAFT AND METHODS FOR MAKING THE SAME

(71) Applicant: Gulfstream Aerospace Corporation, Savannah, GA (US)

(72) Inventors: Brian G. Cook, Savannah, GA (US); John Louis, Savannah, GA (US); Thomas Van de Van, Savannah, GA (US); Robert M. Vieito, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 174 days.

(21) Appl. No.: 13/752,654

(22) Filed: Jan. 29, 2013

(65) Prior Publication Data

US 2014/0209737 A1    Jul. 31, 2014

(51) Int. Cl.
*B64C 9/18* (2006.01)
*B64C 7/00* (2006.01)
*B64C 1/40* (2006.01)

(52) U.S. Cl.
CPC ... *B64C 7/00* (2013.01); *B64C 9/18* (2013.01); *B64C 1/40* (2013.01); *Y10T 29/49826* (2015.01)

(58) Field of Classification Search
CPC .. B64C 3/00; B64C 2700/6233; B64C 3/133; B64C 3/14; B64C 2220/00; B64C 3/26; B64C 1/40; B21D 53/00
USPC .......... 244/123.5, 123.1, 35 R, 1 N; 29/897.2
See application file for complete search history.

(56) References Cited

U.S. PATENT DOCUMENTS

| | | | | |
|---|---|---|---|---|
| 3,853,428 A * | 12/1974 | Hayden et al. | ............ | 416/231 R |
| 5,167,387 A * | 12/1992 | Hartwich | ...................... | 244/200 |
| 6,764,047 B2 * | 7/2004 | Miller et al. | .................. | 244/131 |
| 7,316,539 B2 * | 1/2008 | Campbell | ...................... | 415/115 |
| 7,632,565 B1 * | 12/2009 | Imam et al. | ...................... | 428/307.3 |
| 8,695,915 B1 * | 4/2014 | Jones et al. | .................. | 244/1 N |
| 2008/0008558 A1 * | 1/2008 | Costabel | ...................... | 411/438 |
| 2010/0294883 A1 * | 11/2010 | Trich et al. | ..................... | 244/1 N |
| 2011/0315827 A1 * | 12/2011 | Collins et al. | ................. | 244/7 A |

OTHER PUBLICATIONS

United States International Searching Authority, International Search Report and Written Opinion for International Application No. PCT/US14/13226, mailed Aug. 12, 2014.
"Airframe Noise Reduction Status and Plans," Mehdi R. Khorrami, AT Noise Reduction Element Lead Environmentally Responsible Aviation Integrated Systems Research Program, NASA, AIAA Aero Sciences Meeting Jan. 4-7, 2011, pp. 1-18.
The International Bureau of WIPO, International Preliminary Report on Patentability for International Application No. PCT/US2014/013226 mailed Aug. 13, 2015.

* cited by examiner

*Primary Examiner* — Rob Swiatek
*Assistant Examiner* — Magdalena Topolski
(74) *Attorney, Agent, or Firm* — Ingrassia Fisher & Lorenz PC

(57) ABSTRACT

A flap for operatively coupling to a wing main element of an aircraft is provided. The flap comprises an outer flap section that has a side edge portion. The side edge portion at least partially surrounds a flap side-edge cavity. A porous cavity-filler insert is positioned in the flap side-edge cavity.

17 Claims, 3 Drawing Sheets

WING FLAPS FOR AIRCRAFT AND METHODS FOR MAKING THE SAME

TECHNICAL FIELD

The technical field relates generally to wing flaps for aircraft, and more particularly to wing flaps that include a porous side edge insert for reducing airflow noise for aircraft, aircraft including such wing flaps, and methods for making such wing flaps.

BACKGROUND

An aircraft's airframe and engines produce varying amounts of objectionable audible noise during different flight conditions. On departure, the engines produce the greatest amount of noise. However, during approach, noise from the airframe is also a significant contributor. Airframe noise is generated by the interaction between the airflow and the aircraft structure. The primary sources include landing gear, and wing leading and trailing edges including the high-lift devices and flap systems. On an approach to landing, the wing leading edge devices and the wing trailing edge flap systems are extended and the engines are operating at relatively low thrust levels. During approach, the dominant noise source is generated by the flap systems when the flaps are extended and the lateral flap edges are exposed.

One of the main noise-generating mechanisms at play in flap edge airflows can be attributed to hydrodynamic fluctuations, e.g., shear layer fluctuations, and their interaction with surrounding edges and surfaces. When an airfoil (e.g., flap) creates lift, the inherent pressure difference between the top and bottom surfaces causes air to escape around the edges of the airfoil in an attempt to equalize the pressure. When a wing flap is deployed during takeoff or landing, the flap is deflected downward and the side edges are exposed. At these edges, a shear flow launches at the side edge from a high treasure region at the bottom surface of the flap, initiating a strong vortex. A similar mechanism occurs at the upper side edge, creating another vortex of lesser strength. As the lower and upper vortices migrate rearward, they expand and eventually converge and strengthen. As they progress, the vortices scrub against adjacent structure, creating sound. Additionally, many flap systems include flaps that have exposed cavities formed in their side edges where the sound can resonate, creating tones that increase objectionable audible noise.

Accordingly, it is desirable to provide wing flaps for aircraft that reduce aerodynamically generated noise from the flap side edges when the flaps are extended, for example, during an approach to landing, aircraft including such flaps, and methods for making such flaps. Furthermore, other desirable features and characteristics of the present invention will become apparent from the subsequent detailed description and the appended claims, taken in conjunction with the accompanying drawings and this background.

BRIEF SUMMARY

Flaps for operatively coupling to wing main elements of aircraft, aircraft including such flaps and methods for making such flaps are provided herein. In accordance with an exemplary embodiment, a flap for operatively coupling to a wing main element of an aircraft comprises an outer flap section that has a side edge portion. The side edge portion at least partially surrounds a flap side-edge cavity. A porous cavity-filler insert is positioned in the flap side-edge cavity.

In accordance with another exemplary embodiment, an aircraft comprises a wing main element. A flap is operatively coupled to the wing main element. The flap comprises an outer flap section that has a side edge portion. The side edge portion at least partially surrounds a flap side-edge cavity. A porous cavity-filler insert is positioned in the flap side-edge cavity.

In accordance with another exemplary embodiment, a method for making a flap operatively coupled to a wing main element of an aircraft is provided. The method comprises the steps of positioning a porous cavity-filler insert into a flap side-edge cavity that is at least partially surrounded by a side edge portion of an outer flap section. The porous cavity-filler insert is attached to a close-out rib that is at least partially surrounded by the outer flap section and that is disposed within the flap side-edge cavity.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to wing flaps for aircraft, aircraft including wing flaps, and methods for making such wing flaps. The exemplary embodiments taught herein provide a flap that operatively couples to a wing main element of an aircraft. The flap comprises an outer flap section that is formed at least in part by upper and lower outer skin sections. The outer flap section has a side edge portion that at least partially surrounds a flap side-edge cavity. Disposed in the flap side-edge cavity is a porous cavity-filler insert. In an exemplary embodiment, the porous cavity-filler insert has an exposed outer side surface and is formed of a porous material. The porous material has open cell pores that define torturous pathways formed in and throughout the porous cavity-filler insert. When the flap is partially or fully extended from the wing main element, hydrodynamic fluctuations that occur around the side edge portion of the flap from lower and upper vortices interact with the exposed outer side surface of the porous cavity-filler insert. Some of the energy from the hydrodynamic fluctuations is absorbed by the porous cavity-filler insert by viscous damping in which the surrounding airflow is effectively broken up by diverting a portion of the airflow through the exposed outer side surface and the torturous pathways. As such, the strength of the lower and/or upper vortices is diminished and aerodynamically generated noise from the side edge portion of the flap is reduced.

Figure 1:
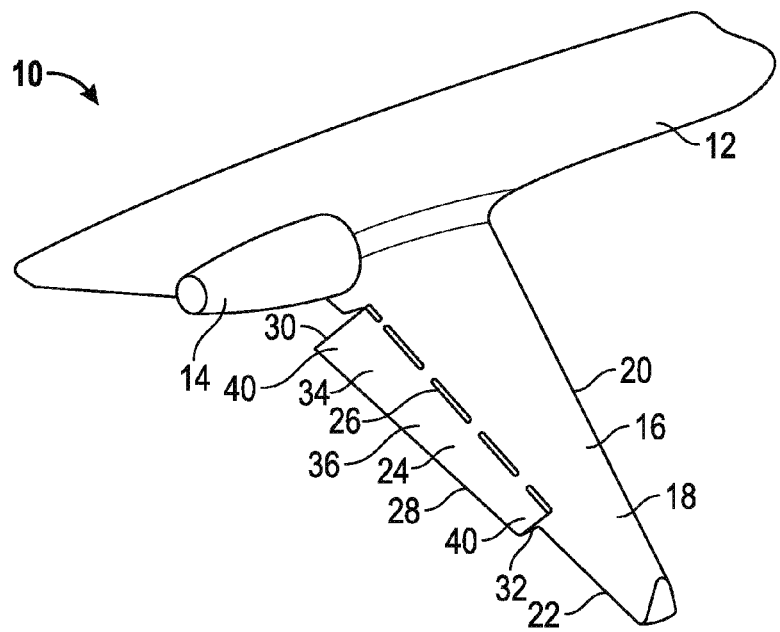
FIG. 1 is a partial perspective view of an aircraft in accordance with an exemplary embodiment.

FIG. 1 is a partial perspective view of an aircraft 10 in accordance with an exemplary embodiment. The aircraft 10 has a fuselage 12 that encloses an aircraft cabin. Adjacent to the fuselage 12 are an engine 14 that is for driving the aircraft 10 and a wing 16 that produces lift for flight. Although the aircraft 10 is shown as having only a single engine 14 and a single wing 16, those skilled in the art will readily appreciate that an aircraft can have multiple engines and typically has two wings.

As illustrated, the wing 16 has an airfoil shape with a relatively high lift-to-drag ratio. The wing 16 includes a wing main element 18 that has a leading edge 20 and a trailing edge 22. Disposed adjacent to the trailing edge 22 and moveably coupled to the wing main element 18 is a flap 24. Although the wing 16 is shown as having only a single flap 24, those skilled in the art will readily appreciate that each wing of an aircraft can have multiple flaps and further include other leading and trailing edge devices.

The flap 24 has a leading edge 26, a trailing edge 28, an inboard flap side-edge 30, and an outboard flap side edge 32. The flap 24 also has an airfoil shape with a relatively high lift-to-drag ratio. When deployed, the flap 24 increases the lift and drag of the wing main element 18. The flap 24 is usually fully extended while landing to allow the aircraft 10 to fly slower by increasing the lift generated by the wing 16 and to steepen the approach to the landing site. Depending on the aircraft type, configuration and methods of takeoff (e.g., short field, soft field, normal, etc.), the flap 24 is often partially extended to give the aircraft 10 more lift during takeoff.

Figure 2:
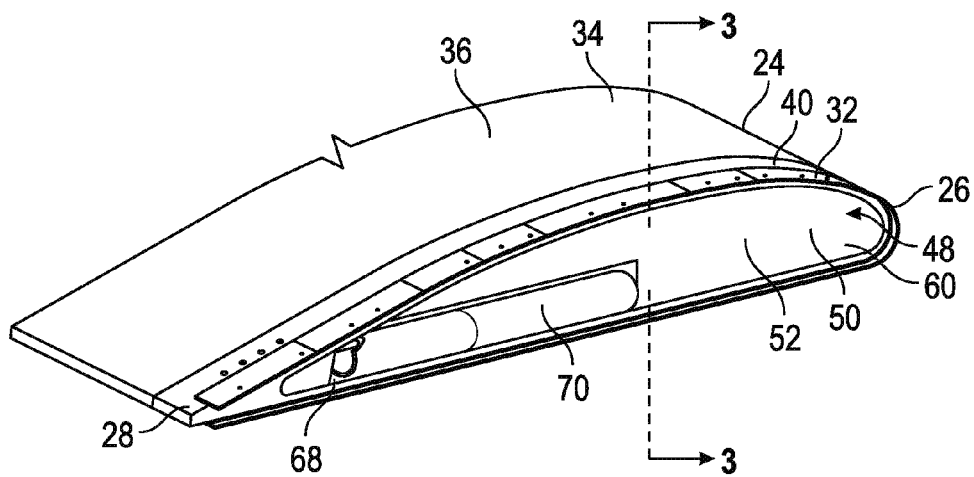
FIG. 2 is a partial perspective view of a flap side edge for operatively coupling to a wing main element of an aircraft in accordance with an exemplary embodiment.
Figure 3:
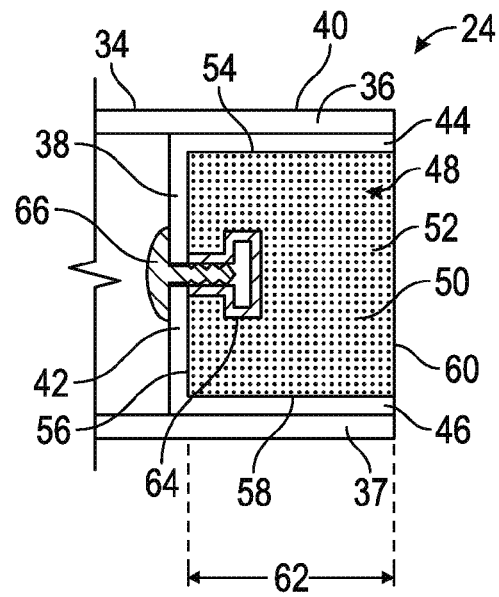
FIG. 3 is a sectional view of the flap side edge depicted in FIG. 2.

FIGS. 2 and 3 are a partial perspective view and a sectional view, respectively, of the flap 24 in accordance with an exemplary embodiment. Referring to FIGS. 1-3, the flap 24 has an outer flap section 34 that is formed at least in part of an upper outer skins section 36 and a lower outer skins section 37. The outer flap section 34 has side edge portions 40 correspondingly disposed along the inboard and outboard flap side-edges 30 and 32. The upper and lower outer skin sections 36 and 37 are supported by a plurality of juxtaposed ribs as is well known in the art including close-out ribs 38, which are the furthest laterally positioned ribs where one is positioned adjacent to the inboard flap side-edge 30 (not shown) and the other positioned adjacent to the outboard flap side-edge 32. In an exemplary embodiment, the close-out ribs 38 each have a "U-shaped" cross section where the bottom 42 of the "U" extends between the upper and lower outer skin sections 36 and 37 and the arms 44 and 46 of the "U" extend along the inside of the upper and lower outer skin sections 36 and 37, respectively.

As illustrated in FIG. 2-3, the side edge portion 40 at least partially surrounds a flap side-edge cavity 48. Disposed in the flap side-edge cavity 48 is a porous cavity-filler insert 50. In an exemplary embodiment, the porous cavity-filler insert 50 substantially fills the flap side-edge cavity 48 and has an outer profile shape that corresponds to the airfoil shape of the flap 24 (see also FIG. 4A).

In an exemplary embodiment, the porous cavity-filler insert 50 is formed of a porous material 52. Non-limiting examples of the porous material 52 includes metal foam(s), polymeric foam(s), fiber reinforced polymeric foam(s), and Nomex™ foam. A Nomex™ foam is a porous structure comprising aramid fibers/paper coated with phenolic resin, which is commercially available from DuPont Inc., headquartered in Wilmington Del. In an exemplary embodiment, the porous material 52 is a metal foam that is relatively robust and resistant to extreme environmental conditions. The metal foam may be formed of a single-element metallic material or alternatively, may be formed of a metal alloy(s) or multiple metallic materials. Non-limiting examples of metallic materials include copper, aluminum, stainless steel, and high temperature iron-based alloys, such as FeCrAlY and the like. Non-limiting examples of metal foams are Porvair™ metal foams that are commercially available from Porvair plc, located in the United Kingdom.

In an exemplary embodiment, the porous material 52 has an open cell pore structure that defines torturous pathways formed in and through the porous cavity-filler inserts 50. In one embodiment, the porous material 52 has pores with an average pore size of from about 25 to about 200 pores per inch (PPI), such as from about 60 to about 100 PPI, for example about 80 PPI. In another embodiment, the porous material 52 has a relative density (i.e., (density of the porous material/actual density of the solid material used to form the porous material)×100%) of from about 4 to about 8%.

As illustrated, the porous cavity-filler insert 50 has a upper surface 54, a covered inner side surface 56, a lower surface 58, and an exposed outer side surface 60. In particular, the upper outer skins section 36 and the arm 44 of the "U" of the close-out ribs 38 cover the upper surface 54, the bottom 42 of the "U" of the close-out ribs 38 covers the covered inner side surface 56, the lower outer skins section 37 and the arm 46 of the "U" of the close-out ribs 38 cover the lower surface 58, and the exposed outer side surface 60 is exposed to the area outside of the side edge portion 40. As such, when hydrodynamic fluctuations occur around the side edge portion 40 of the flap 24, such as when the flap 24 is partially or fully extended from the wing main element 18 (see FIG. 1), surrounding airflow (e.g., from the lower and upper vortices) interacts with the exposed outer side surface 60 of the porous cavity-filler insert. Some of the energy from the hydrodynamic fluctuations is absorbed by the porous cavity-filler insert 50 by viscous damping. In particular, a portion of the surrounding airflow is diverted through the exposed outer side surface 60 and the torturous pathways where the portion of airflow loses strength, and further is reflected back off of the covered surfaces 54, 56, and 58 to the area outside of the side edge portion 40 to additionally disrupt the surrounding airflow. As such, the strength of the hydrodynamic fluctuations of the surrounding airflow is diminished and aerodynamically generated noise from the side edge portion 40 of the flap 24 is reduced.

Additionally, it has been found that the depth (indicated by double headed arrow 62) of the porous cavity-filler insert 50 can be adjusted to help tune the broadband acoustic absorption characteristics of the porous cavity-filler insert 50 to enhance reducing the airflow noise from the side edge portion 40 of the flap 24. The thickness 62 of the porous cavity-filler insert 50 influences the length and/or complexity of the torturous pathways that determine the absorption characteristics of airflow noise.

Figure 4A:
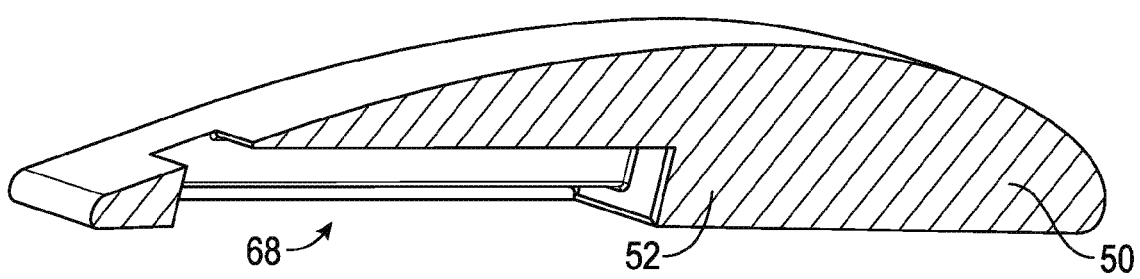
FIG. 4A is a side perspective view of a porous cavity-filler insert in accordance with an exemplary embodiment.

Referring to FIGS. 2 and 4A, in an exemplary embodiment, the porous cavity-filler insert 50 has a lower channel 68 formed in a lower section of the porous cavity-filler insert 50. Disposed in the lower channel 68, is a seal 70 that seats against the wing 16 (see FIG. 1) when the flap 24 is in a retracted position to prevent airflow between the side edge portion 40 of the flap 24 and the wing 16.

Figure 4B:
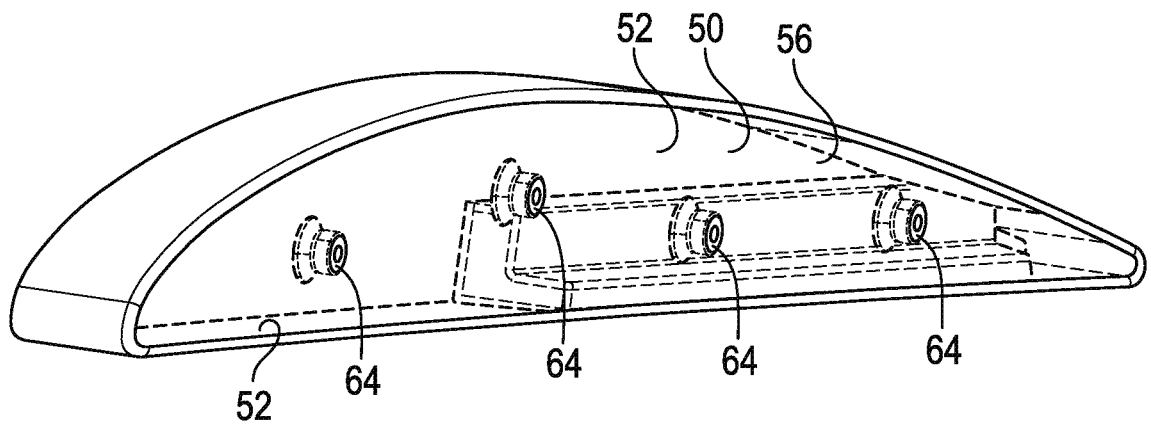
FIG. 4B is a side perspective view of a porous cavity-filler insert in accordance with an exemplary embodiment.

Referring to FIGS. 3 and 4B, in accordance with an exemplary embodiment, the porous cavity-filler insert 50 is attached to the close-out ribs 38. As illustrated, the porous cavity-filler insert 50 has multiple embedded threaded inserts 64 that are spaced apart from each other and extend from the covered inner side surface 56 into the body of the porous cavity-filler insert 50. Threaded fasteners 66 are correspondingly engaged with the embedded threaded inserts 64 and the close-out ribs 38 to attach the porous cavity-filler insert 50 to the close-out ribs 38.

Figure 5:
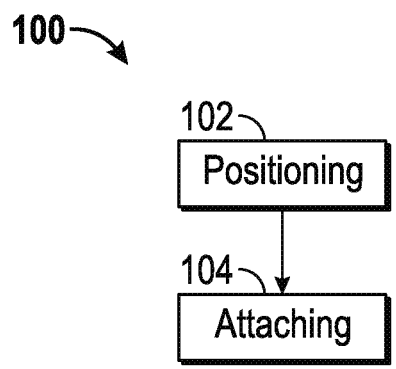
FIG. 5 is a flowchart of a method for making a flap for operatively coupling to a wing main element of an aircraft in accordance with an exemplary embodiment.

FIG. 5 is a flowchart of a method 100 for making a flap for operatively coupling to a wing main element of an aircraft in accordance with an exemplary embodiment. The method 100 comprises positioning (step 102) a porous cavity-filler insert into a flap side-edge cavity that is at least partially surrounded by a side edge portion of an outer flap section. The porous cavity-filler insert is attached (step 104) to a close-out ribs that is at least partially surrounded by the outer flap section and that is positioned in the flap side-edge cavity.

Accordingly, wing flaps for aircraft, aircraft including wing flaps, and methods for making such wing flaps have been described. The exemplary embodiments taught herein provide a flap that operatively couples to a wing main element of an aircraft. The flap comprises an outer flap section that has a side edge portion that at least partially surrounds a flap side-edge cavity. Disposed in the flap side-edge cavity is a porous cavity-filler insert. In an exemplary embodiment, the porous cavity-filler insert has an exposed outer side surface and is formed of a porous material. The porous material has open cell pores that define torturous pathways formed in and through the porous cavity-filler insert. When the flap is partially or fully extended from the wing main element, hydrodynamic fluctuations that occur around the side edge portion of the flap from lower and upper vortices interact with the exposed outer side surface of the porous cavity-filler insert. Some of the energy from the hydrodynamic fluctuations is absorbed by the porous cavity-filler insert to diminish the strength of the lower and/or upper vortices and reduce airflow noise generated at the side edge portion of the flap.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A wing control body for an aircraft, the wing control body comprising:
    an outer section adjacent to a flap-to-wing interface, the outer section comprising a side edge portion that at least partially surrounds a side-edge cavity and is at least partially formed from an upper outer skin section and a lower outer skin section; and
    a close-out rib that extends between the upper and lower outer skin sections and that is disposed adjacent to the side-edge cavity; and
    a porous cavity-filler insert positioned in the side-edge cavity and having an upper surface, a lower surface, a covered inner side surface, and an exposed outer side surface, and
    wherein the outer section covers the covered upper and lower surfaces of the porous cavity-filler insert, the close-out rib opposes the covered inner side surface, and the exposed outer side surface is exposed to an area outside of the side edge portion of the wing control body.

2. The wing control body of claim 1, wherein the porous cavity-filler insert is attached to the close-out rib.

3. The wing control body of claim 2, wherein the porous cavity-filler insert comprises a plurality of embedded threaded inserts, and wherein the porous cavity-filler insert is attached to the close-out rib via multiple threaded fasteners that correspondingly engage with the embedded threaded inserts and the close-out rib.

4. The wing control body of claim 1, wherein the porous cavity-filler insert comprises a porous material, wherein the porous material is selected from the group consisting of metal foam, a polymeric foam, a fiber reinforced polymeric foam, a porous structure comprising aramid fibers/paper coated with phenolic resin, and combinations thereof.

5. The wing control body of claim 4, wherein the porous material is the metal foam.

6. The wing control body of claim 1, wherein the porous cavity-filler insert comprises a porous material that has pores with an average pore size of from about 25 to about 200 pores per inch.

7. The wing control body of claim 6, wherein the average pore size is from about 60 to about 100 pores per inch.

8. The wing control body of claim 1, wherein the porous cavity-filler insert comprises a porous material having a relative density of from about 4 to about 8%.

9. The wing control body of claim 1, wherein the porous cavity-filler insert comprises a porous material having open cells pores formed therein.

10. The wing control body of claim 1, wherein the porous cavity-filler insert has a lower channel formed therein, and wherein the flap further includes a seal disposed in the lower channel.

11. The wing control body of claim 1, wherein the porous cavity-filler insert has a thickness defined along a longitudinal axis of the wing control body.

12. The wing control body of claim 1, wherein the wing control body is one of a flap and a wing main element adjacent to the flap.

13. The wing control body of claim 12, wherein the wing control body is the flap operatively coupled with the wing main element.

14. An aircraft comprising:
    a wing main element; and
    a flap operatively coupled to the wing main element, and wherein at least one of the wing main element and the flap comprising:
        an outer flap section having a side edge portion that at least partially surrounds a flap side-edge cavity; and
        a porous cavity-filler insert positioned in the flap side-edge cavity, wherein the flap side-edge cavity is an inboard flap side-edge cavity and the porous cavity-filler insert is disposed in the inboard flap side-edge cavity, wherein the outer flap section comprises an upper outer skin section and a lower outer skin section, and wherein the flap further comprises a close-out rib that extends between the upper and lower outer skin sections and that is disposed adjacent to the flap side-edge cavity, and wherein the porous cavity-filler insert is attached to the close-out rib.

15. The aircraft of claim 14, wherein the flap side-edge cavity is an outboard flap side-edge cavity and the porous cavity-filler insert is disposed in the outboard flap side-edge cavity.

16. The aircraft of claim 14, wherein the porous cavity-filler insert comprises a porous material that has pores with an average pore size of from about 25 to about 200 pores per inch.

17. A method for making a wing control body with a flap side edge for an aircraft, the method comprising the steps of:
   positioning a porous cavity-filler insert into a flap side-edge cavity that is at least partially surrounded by a side edge portion of an outer flap section; and
   attaching the porous cavity-filler insert to a close-out rib that is at least partially surrounded by the outer flap section and that is disposed adjacent to the flap side-edge cavity.

\* \* \* \* \*